(12) United States Patent
Yan

(10) Patent No.: US 7,580,836 B1
(45) Date of Patent: Aug. 25, 2009

(54) SPEAKER ADAPTATION USING WEIGHTED FEEDBACK

(75) Inventor: Yonghong Yan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 986 days.

(21) Appl. No.: 10/019,882

(22) PCT Filed: Jun. 15, 2000

(86) PCT No.: PCT/CN00/00158

§ 371 (c)(1),
(2), (4) Date: Apr. 15, 2002

(87) PCT Pub. No.: WO02/01549

PCT Pub. Date: Jan. 3, 2002

(51) Int. Cl.
*G10L 15/06* (2006.01)
*G10L 15/00* (2006.01)

(52) U.S. Cl. .................. 704/244; 704/243; 704/251

(58) Field of Classification Search .......... 704/243–251
See application file for complete search history.

(56) References Cited

U.S. PATENT DOCUMENTS

| | | | | |
|---|---|---|---|---|
| 4,827,521 A * | 5/1989 | Bahl et al. | ............... | 704/256.4 |
| 5,127,055 A * | 6/1992 | Larkey | ............... | 704/244 |
| 5,144,672 A | 9/1992 | Kuriki | | |
| 5,835,890 A | 11/1998 | Matsui et al. | | |
| 6,195,637 B1 * | 2/2001 | Ballard et al. | ............... | 704/235 |
| 6,205,426 B1 * | 3/2001 | Nguyen et al. | ............... | 704/255 |
| 6,253,181 B1 * | 6/2001 | Junqua | ............... | 704/244 |
| 6,260,013 B1 * | 7/2001 | Sejnoha | ............... | 704/240 |
| 6,272,462 B1 * | 8/2001 | Nguyen et al. | ............... | 704/244 |
| 6,535,850 B1 * | 3/2003 | Bayya | ............... | 704/239 |
| 6,799,162 B1 * | 9/2004 | Goronzy et al. | ............... | 704/244 |
| 7,216,079 B1 * | 5/2007 | Barnard et al. | ............... | 704/244 |

FOREIGN PATENT DOCUMENTS

| | | |
|---|---|---|
| CN | 1243304 A | 2/2000 |
| EP | 0686965 A2 | 12/1995 |
| EP | 0805434 A2 | 5/1997 |

OTHER PUBLICATIONS

Yu et al. "Corrective training for speaker adaptation", In Eurospeech'99, 1999, pp. 2535-2538.*

Ngyen et al. "N-Best Based Supervised and Unsupervised Adaptation for Native and Non-Native Speakers in Cars", Proc. IEEE Int. Conf. on Acoustics, Speech, and Signal Processing, Phoenix, AZ, USA, May 1999, pp. 173-176.*

Zheng et al, "Efficiently Using Speaker Adaptation Data", in ICSLP 2000, Beijing, China, Oct. 2000, pp. 1-4.*

(Continued)

*Primary Examiner*—James S Wozniak
(74) *Attorney, Agent, or Firm*—Blakely, Sokoloff, Taylor & Zafman LLP

(57) ABSTRACT

In some embodiments, the invention includes calculating estimated weights for identified errors in recognition of utterances. Sections of the utterances are marked as being misrecognized and the corresponding estimated weights are associated with these sections of the utterances. The weighted sections of the utterances are used to convert a speaker independent model to a speaker dependent model.

30 Claims, 4 Drawing Sheets

OTHER PUBLICATIONS

Zheng et al, "Improving Speaker Adaptation by Adjusting The Adaptation Data Set", in ISPACS 2000, Nov. 2000, pp. 1-4.*

Zheng et al, "Efficiently Using Speaker Adaptation Data", in ICSLP 2000, ICSLP 2000, BeiJing, China, Oct. 2000, pp. 258-361.*

Haffner et al, "Integrating time alignment and neural networks for high performance continuous speech recognition", Acoustics, Speech, and Signal Processing, 1991. ICASSP-91., 1991 International Conference on, Apr. 1991, pp. 105-108.*

Jean-Luc Gauvain, et al., "Maximum a Poseriori Estimation for Multivariate Gaussian Mixture Observations of Markov Chains," IEEE Trans. On Speech and Audio Processing, vol. 2, pp. 291-298, 1994.

L.R. Bahl, et al., "A New Algorithm for the estimation of Hidden Markov Model Parameters," IEEE International Conference on Acoustics, Speech, and Signal Processing, p. 493-496, 1988.

C.J. Leggetter, et al., "Maximum likelihood linear regression for speaker adaptation of continuous density HMMs," Computer Speech and language, vol. 9, pp. 171-185, 1995.

A.P. Dempster, et al., "Maximum likelihood from incomplete data via the EM algorithm," J. of the Royal Statistical Society, Series B 39, pp. 1-38, 1977.

N. Laird, "The EM Algorithm," Handbook of Statistics, vol. 9, Elsevier Science Publishers B.V., 1993.

* cited by examiner

{ Segment 1   Segment 2   • • •   Segment X }

Section (e.g., word)

SPEAKER ADAPTATION USING WEIGHTED FEEDBACK

BACKGROUND

1. Technical Field of the Invention

The present invention relates to speech recognition systems and, more particularly, to speaker adaptation using feedback.

2. Background Art

Speech recognition systems using only Speaker Independent (SI) models are very sensitive to different speakers due to speaker characteristic variations. SI models typically use a Hidden Markov Model (HMM). Speaker adaptation is a process to adapt a SI model to a speaker dependent (SD) model to capture the physical characteristics of a given speaker. Speaker adaptation techniques can be used in supervised and unsupervised mode. In supervised mode, the correct transcription is known, while in unsupervised mode, no correct transcription is available.

For reliable and robust speaker adaptation, large amounts of adaptation data are often required in order to cover the linguistic units of a given language. However for most practical applications, only a limited amount of adaptation data is available. Efficient use of the adaptation data becomes extremely important. The traditional adaptation schemes treat all the adaptation data indiscriminately, which results in some parts of the adaptation data being relatively under-trained or under-weighted. Usually the under represented words are more unlikely to be recognized by the decoder.

The traditional adaptation scheme is as follows:

1. Given some adaptation enrollment data and a SI model, collect statistics on the enrollment data and perform speaker adaptation on the SI model.

2. Decoding the test utterances with the adapted acoustic model. Such a scheme uses the enrollment data only once and does not incorporate any feedback from decoding. It is fast in practice, but does not always provide good performance.

Approaches to speaker adaptation include those described in J. L. Gauvain et al. "Maximum a posteriori estimation for multivariate Gaussian mixture observations of Markov Chain," IEEE Trans. On Speech and Audio Processing, Vol. 2, pp. 291-298; L. R. Bahl, et al., "A New Algorithm for the estimation of Hidden Markov Model Parameters," IEEE International Conference on Acoustics, Speech, and Signal Processing, pp. 493-496, 1988; and C. L. Leggetter et al., "Maximum likelihood linear regression for speaker adaptation of continuous density HMMs," Computer Speech and Language, Vol. 9, pp. 171-185, 1995. In some of these approaches, errors included in recognizing a particular speaker's utterances are not considered. In a "corrective training" approach, such as in the above-recited L. R. Bahl et al. article, an error in recognition of the utterance may be considered, but a very complicated technique is used to compensate for it. Background articles on expectation maximization (EM) maximum likelihood (ML) are provided in the articles A. P. Dempster, et al., "Maximum likelihood from incomplete data via the EM algorithm," Journal of the Royal statistical Society, Series B 39, pp. 1-38, 1977; and N. Laird, "The EM algorithm," Handbook of Statistics, vol. 9. Elsevier Science Publishers B. V. 1993.

An iterative technique in speech recognition is to recognize utterances based on an SI model and to create an SD model therefrom and then to apply the SD model to recognizing the utterances to create a more refined SD model and so forth.

There is a need for improved techniques for speaker adaptation. Such improved techniques are described in this disclosure.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The present invention involves speaker adaptation whereby characteristics of an SI model can be adapted through consideration of adaptation enrollment data from a particular speaker to create an SD model. More particularly, the adaptation enrollment data is weighted according to errors detected in the recognized utterances. For those words (or utterances in the enrollment data set) that are not well learnt by speaker adaptation, as indicated by misrecognizing those words, the invention provides a way to incorporate the decoding feedback so that these words can be better adapted. When only limited amounts of enrollment data are available, this scheme of iterative bootstrapping makes better use of that limited data. The scheme can be extended to the unsupervised adaptation where references may contain errors. In some embodiments, an iterative adaptation scheme dynamically adjusts enrollment data to incorporate feedback from decoding on the enrollment data.

In the following disclosure, the term "some embodiments" or "other embodiments" means that a particular feature, structure, or characteristic described in connection with the embodiments is included in at least some embodiments, but not necessarily all embodiments, of the invention. The various appearances "some embodiments" are not necessarily all referring to the same embodiments. In the following disclosure, when the term phone is used, it could include all phonemes in a particular language or less than all the phonemes. To reduce complexity, some speech recognition systems do not recognize every phoneme in a particular language.

The following four parts are used in some embodiments of the invention. A fifth part is used in still other embodiments.

1. Denote M as the initial SI (speaker independent) model and A as the enrollment data set.

2. Perform speech recognition on data set A based on model M.

3. Adjust A to A' according to the decoding results from part 2. Emphasizing or de-emphasizing certain parts of A with weights based on these results. The emphasizing/de-emphasizing is achieved by assigning a weight to each word in the adaptation data. How to calculate the weight will be discussed below.

4. Adapt model M to M' using enrollment data A'.

5. (optional) Repeat parts 3 and 4 with the updated M'.

Figure 1:
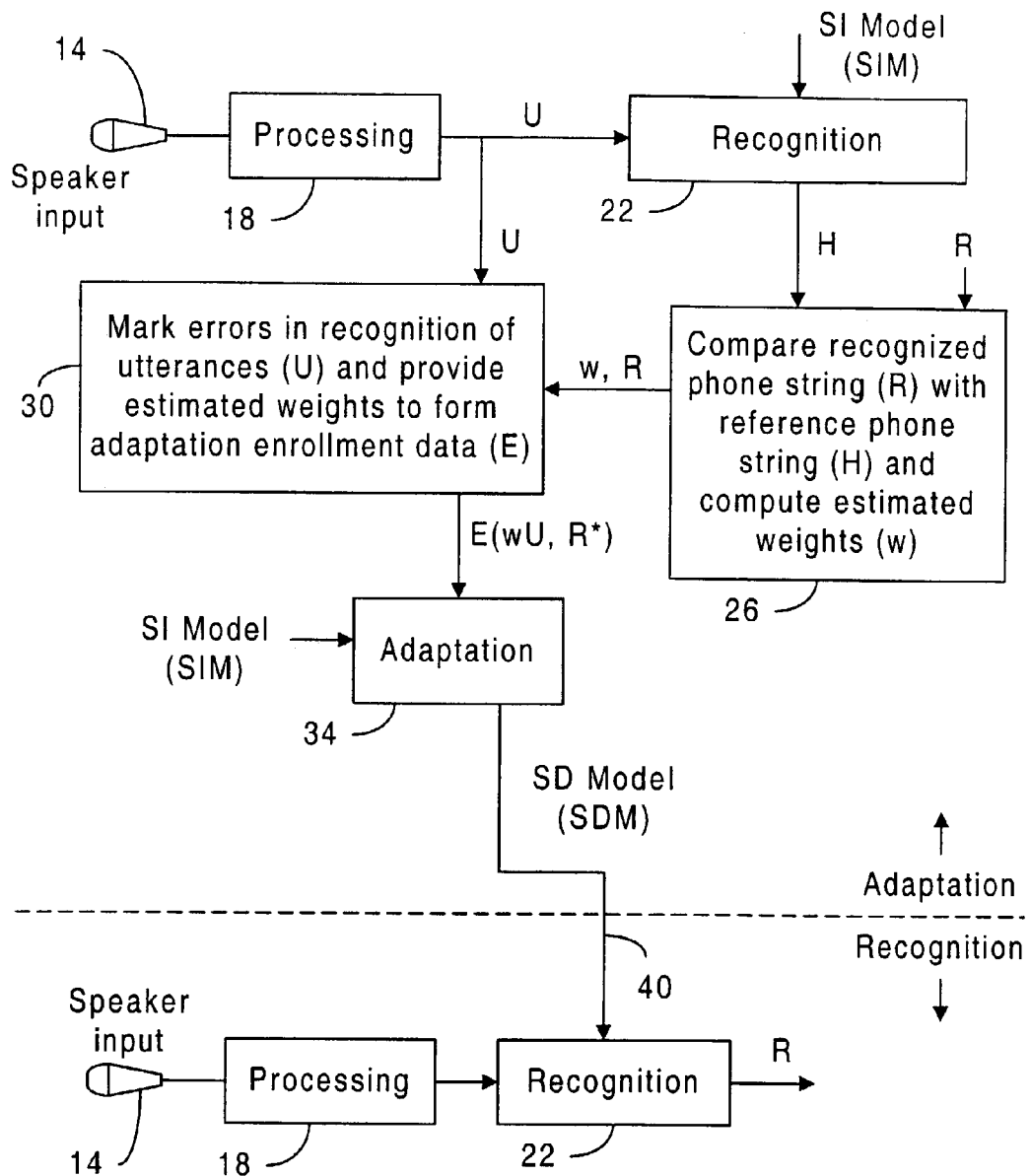
FIG. 1 is a partial flow and partial block diagram representation of some embodiments of the invention.

For example, FIG. 1 is represents some embodiments of the invention in a diagram which is partially a flow diagram and partially a block diagram. A dashed line represents a dividing line between acts occurring during an adaptation mode and a recognition (decoding) mode. The recognition phase occurs after the SD model is created in the adaptation phase. Note that microphone 14, processing block 18, and recognition block 22 are shown above and below the dashed line and may represent the same blocks at different times (before and after the conclusion of adaptation). In this disclosure, a block may be hardware or a combination of hardware and software.

Referring to FIG. 1 above the dashed line, a speaker input such as microphone 14 receives utterances of a particular speaker. The utterances are converted to digital signals U and may be otherwise processed according to well know techniques by processing block 18. Note that microphone 14 may be adjacent to the computer system that performs the acts illustrated in FIG. 1 or microphone may be remote from it. For example, microphone 14 may be in a telephone or remote other system. Processing block 18 provides the processed utterances U to a recognition block 22 and a weighting block 30. Utterances U may be stored in a wave file as a collection of utterances. Of course, there may be spaces of silence or lack of speech between the sections of the utterances.

Recognition block 22 produces a recognized (hypothesized) phone string H based on the utterances U and an SI model. In a comparison and weight calculating block 26, recognized phone string H is compared with a reference (true) phone string R. The reference phone string is what the speaker is requested to read. A word-phone dictionary may be used to convert the reference word string into phones. Of course, there may be silences or lack of speech in the recognized and reference phone strings.

Differences between the recognized and reference phone string can be determined in a variety of ways. In some embodiments, speech features in the recognized and reference phone strings are compared on a frame by frame level. Merely as an example, the frames may be on the order of about 25 milliseconds (ms), although various other frame durations could be used. A phone may be around 200 milliseconds, although various other phone durations are possible. Accordingly, in some embodiments, there may be on the order of 10 frames per phone. A force alignment algorithm may be used to mark the time or place each phone (or word) happens in the utterances. The frames may contain a Gaussian feature vector.

Figures 2, 3:
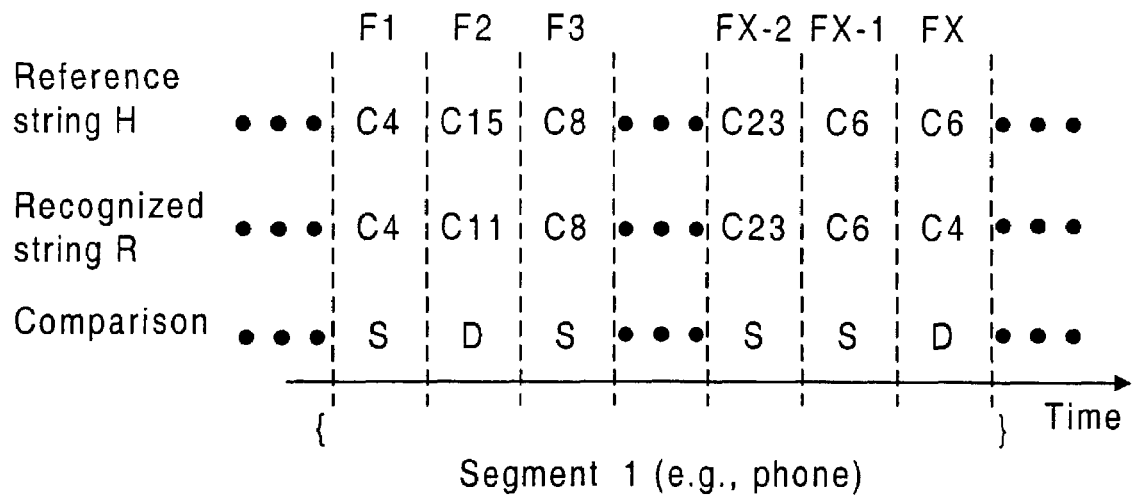
FIG. 2 illustrates a segment (e.g., a phone) of the utterances which includes multiple frames.
FIG. 3 illustrates a section (e.g., word) of the utterances which includes multiple segments (e.g., phones).

For example, referring to FIG. 2, portions of the reference string and recognized string for a series of frames are illustrated. The frames are arbitrarily labeled F1, F2, F3, . . . , FX-2, FX-1, and FX, wherein there may be several frames between frames F3 and FX-2. The portions in a frame may be a feature extraction. Each portion (e.g., feature extraction) has characteristics (e.g., Gaussian), which are labeled "C." The particular number after the "C" is arbitrarily chosen. For example, in frame F1, both the reference and recognized strings have characteristics C4. Accordingly, the comparison indicates that the characteristics of the reference and recognized strings are the same (S) for frame F1. In frame F2, the characteristic of the reference string is C15 and the characteristic of the recognized string is C11. Accordingly, the comparison indicates that the characteristics of the reference and recognized strings are the different (D) for frame F2. (Merely as an example, S could be "0" and D could be "1," or various other schemes could be used.) Likewise, in frames F3, FX-2, and FX-1, the characteristics are the same and in frame FX, the characteristics are different.

In some embodiments, a certain number of frames forms a segment. The segment may be a phone or other portion of the utterance. Referring to FIG. 2, as an example, a segment 1 may be formed of frames F1, F2, F3, . . . , FX-2, FX-1, FX. As illustrated in FIG. 3, a section of the utterances may be formed of multiple segments. In some embodiments, the section is a word, although the invention is not so limited. Segments of silence or lack of speech can be used to indicate the boundary of a word.

If a word includes a phone having an error (the characteristics of a frame of the reference and hypothesis in the word are different (see FIG. 2)), then the word is considered an error word, and the weight of the word is calculated.

The weights assigned to the sections of utterances U may be calculated in block 26 through various techniques. The following are some examples, although the invention is not limited to the examples.

In some embodiments, the weight value for each word is estimated from the likelihood information of the references (the true input word string) and hypotheses (the word string decoded by the recognizer, may contain errors).

1. Run a force alignment program on the reference stream to get statistics of the references.

2. Decode the utterance to get statistics of the 1-best hypothesis.

3. Align the 1-best hypothesis with the reference sentence to obtain the error words.

4. Calculate the average likelihood difference per frame according to the equation (1) as follows:

$$Ln = \frac{H_L^n}{H_e^n - H_b^n} - \frac{R_L^n}{R_e^n - R_b^n}, \quad (1)$$

where $H_L^n$ is the log likelihood of hypothesis word n, $H_b^n$ is the beginning frame index (in time), and $H_e^n$ is the end frame index. $R_L^n$, $R_b^n$ and $R_e^n$ are the reference counter parts. Of course, the invention is not limited to the details of equation (1). Note that equation (1) involves likelihoods, which are not necessarily probabilities. Equation (1) could be modified to involve probabilities.

Next, the weight value $W_i$ for misrecognized words of a particular speaker "i" is obtained by averaging $L_n$ over all the misrecognized words (error words) according to equation (2) as follows:

$$W_i = \frac{1}{m} * \sum_{n=1}^{m} |Ln|, \quad (2)$$

wherein m may be the number of misrecognized words. Of course, the invention is not limited to the details of equation (2). In equation (2), the sections are for words (e.g., "W" refers to words), but the sections could be something else. (See FIG. 3.)

Note that in embodiments using equation (2), each misrecognized word may have the same averaged weight. Alternatively, different words could have different weights through applying the result of equation (1) more directly.

Once the weights are calculated, the weights and places of error are provided to block 30. The reference string (or at least the portions of the reference string corresponding to the errors in the recognized stream) is communicated to block 30. In block 30, the utterance U is marked with the errors and corresponding weights are noted. The adaptation enrollment data (E) includes the marked utterances with corresponding weights (wU) and at least those portions of the reference stream (R*) that correspond to the errors in the utterance. The SI model and SD model may be Gaussian mixtures. The wavefile U may be transformed (e.g., through an FFT) from the time domain to the frequency domain. The weight w may be expressed as a floating point number.

In adaptation box 34, the adaptation enrollment data is applied with the SI model to create the SD model according to known techniques, except that the enrollment data may have additional weights. In some embodiments, in the adaptation box 34, the error words are added w times to the SI model. In some embodiments, these weights are added to those of the SI model, although the invention is not limited to this. More complicated schemes could be used, but are not required.

It is important to not give too much weight to the enrollment data, because they are based on limited sampling.

In the above described embodiments, weights are only calculated for words for which there is an error in recognition. Alternatively, there could be weights (e.g., negative weights) for correctly recognized words. Note that in different embodiments the weights can be positive or negative depending on the scheme chosen.

Once the SD model is calculated in an adaptation mode, it is applied on path 40 for use by block 22 in a recognition mode, below the dashed line.

Figure 4:
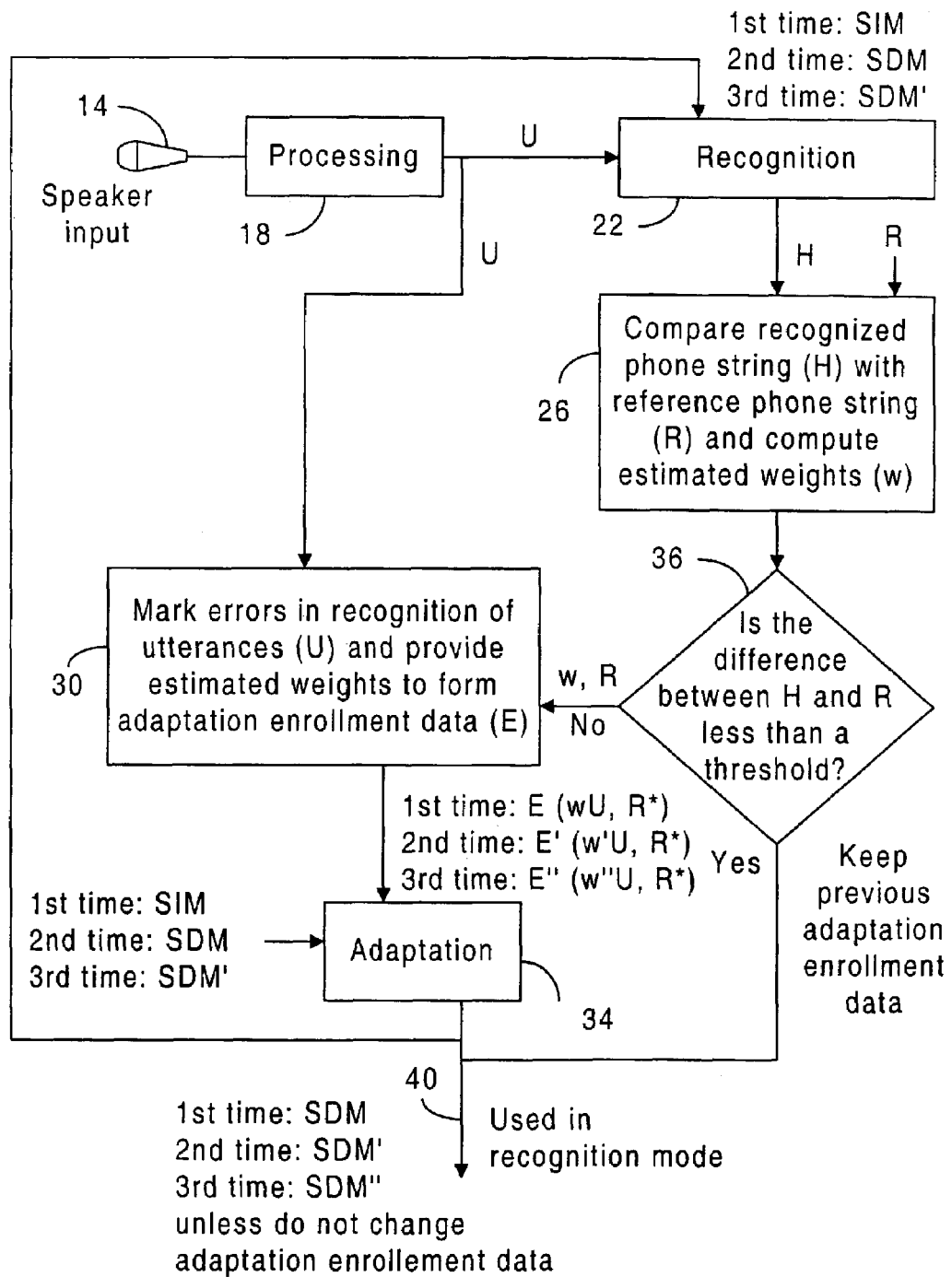
FIG. 4 is partial flow and partial block diagram representation similar to a portion of FIG. 1, but may allow multiple feedback passes.

FIG. 4 illustrates that the feedback can be performed more than once until differences between H and R are less than a threshold (see decision block 36). (It could be less than or equal to a threshold.) To determine whether the differences between H and R are less than a threshold, the various errors can be summed and then compared to a single threshold or different errors can be compared to separate thresholds. Other approaches could be used.

Note that in FIG. 4, the input to recognition block 22 changes with each pass. The utterances may be stored for re-use. The inputs to the adaptation block 24 also changes, however, if the difference between H and R is less than a threshold, then the previous enrollment data is the one applied to path 40 for use during recognition mode (decoding).

Figure 5:
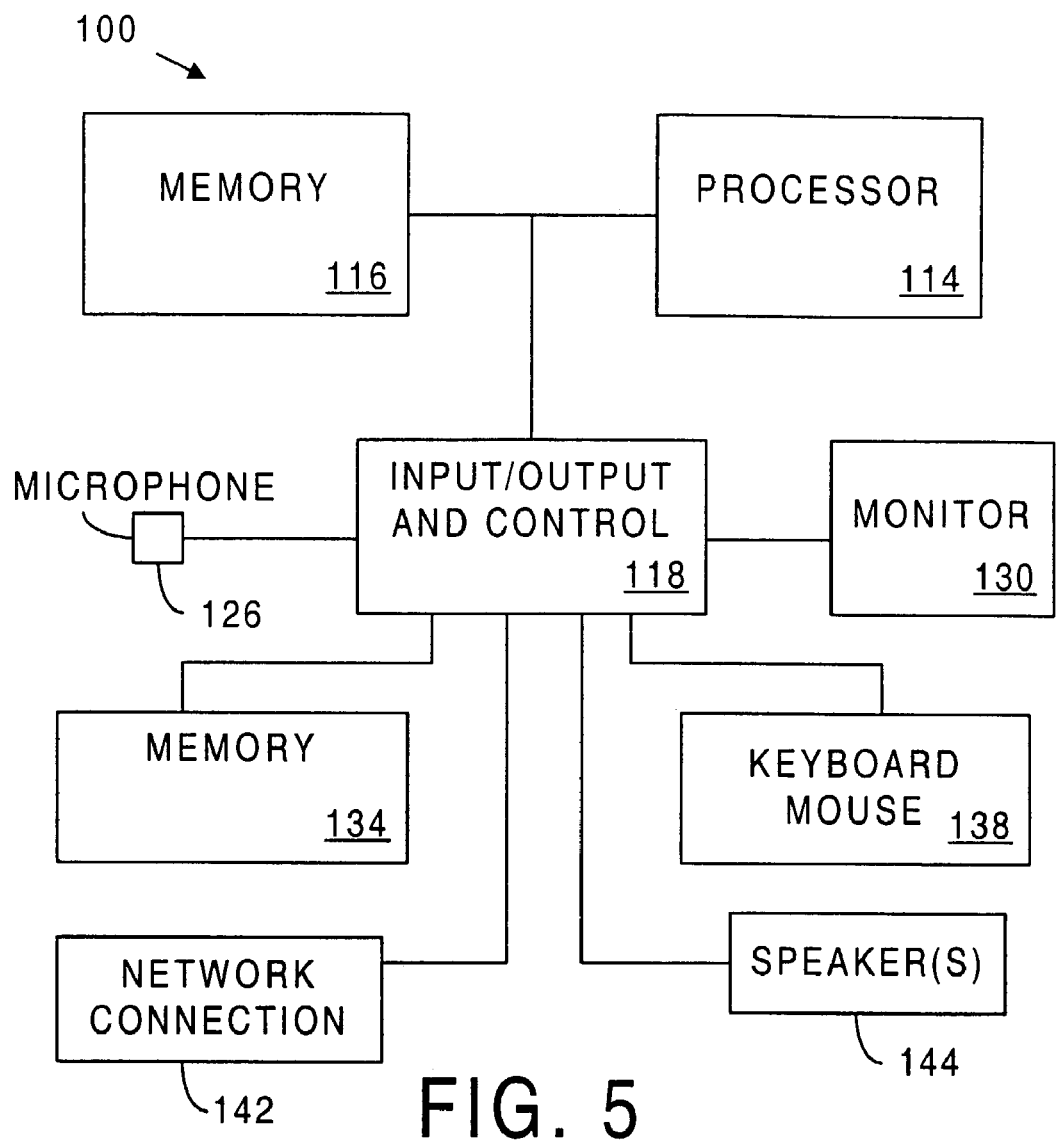
FIG. 5 is a high level schematic block diagram representation of a computer system that may be used in connection with some embodiments of the invention.

There are a variety of computer systems that may be used in training and using a speech recognition system. Merely as an example, FIG. 5 illustrates a highly schematic representation of a computer system 100 which includes a processor 114, memory 116, and input/output and control block 118. There may be a substantially amount of memory in processor 114 and memory 116 may represent both memory that is off the chip of processor 114 or memory that is partially on and partially off the chip of processor 114. (Or memory 116 could be completely on the chip of processor 114). At least some of the input/output and control block 118 could be on the same chip as processor 114, or be on a separate chip. A microphone 126, monitor 130, additional memory 134, and input devices (such as a keyboard and mouse 138), a network connection 142, and speaker(s) 144 may interface with input/output and control block 118. Memory 134 represents a variety of memory such as a hard drive and CD ROM or DVD discs. It is emphasized that the system of FIG. 1 is merely exemplary and the invention is not limited to use with such a computer system. Computer system 100 and other computer systems used to carry out the invention may be in a variety of forms, such as desktop, mainframe, and portable computers.

Figure 6:
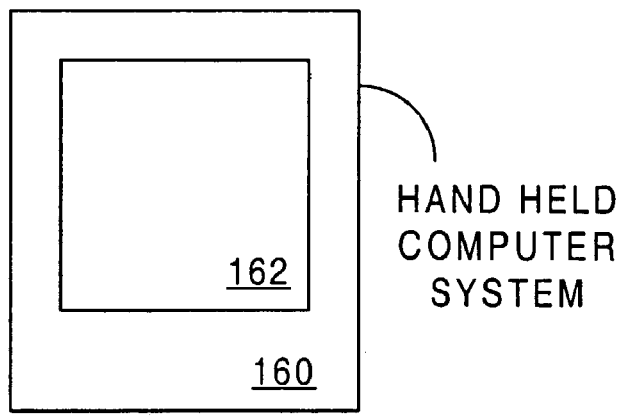
FIG. 6 is a high level schematic representation of a handheld computer system that may be used in connection with some embodiments of the invention.

For example, FIG. 6 illustrates a handheld device 160, with a display 162, which may incorporate some or all the features of FIG. 5. The hand held device may at times interface with another computer system, such as that of FIG. 5. The shapes and relative sizes of the objects in FIGS. 5 and 6 are not intended to suggest actual shapes and relative sizes.

Various memories mentioned above (e.g., CD-ROM, flash memory, hard-drive) include computer readable storage mediums on which in instructions may be stored which when executed cause some embodiments of the invention to occur.

If this disclosure states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method comprising:
   (a) calculating estimated weights for identified errors in recognition of utterances of a speaker based on a reference string, the utterances being received by a speaker input and converted to digital signals;
   (b) marking sections of the utterances as being misrecognized and associating the estimated weights with the sections of the utterances; and
   (c) using the weighted sections of the utterances to convert a speaker independent model to a speaker dependent model;
   wherein calculating the estimated weights comprises computing an average likelihood difference per frame and then computing a weight value by averaging the average likelihood difference over error words.

2. The method of claim 1, wherein parts (a)-(c) are repeated at least once.

3. The method of claim 1, wherein the utterances are converted into a recognized phone string a first time through applying the speaker independent model and thereafter through applying the most recently obtained speaker dependent model.

4. The method of claim 1, wherein for a particular speaker, different misrecognized words have different weights.

5. The method of claim 1 wherein calculating the estimated weights further comprises:
   running a force alignment program on the reference string to obtain statistics of references;
   decoding the utterances to obtain statistics of 1-best hypothesis; and
   aligning the 1-best hypothesis with the reference string to obtain the error words.

6. A method comprising:
   (a) calculating estimated weights for identified errors in recognition of utterances of a speaker based on a reference string, the utterances being received by a speaker input and converted to digital signals;
   (b) marking sections of the utterances as being misrecognized and associating the estimated weights with the sections of the utterances; and (c) using the weighted sections of the utterances to convert a speaker independent model to a speaker dependent model;

wherein calculating the estimated weights comprises computing an average likelihood difference per frame according to equation (1) as follows:

$$Ln = \frac{H_L^n}{H_e^n - H_b^n} - \frac{R_L^n}{R_e^n - R_b^n}, \quad (1)$$

where $H_L^n$ is a log likelihood of hypothesis word n, $H_b^n$ is a beginning frame index (in time), and $H_e^n$ is an end frame index, and $R_L^n$, $R_b^n$ and $R_e^n$ are counter parts for the reference string, and computing a weight for misrecognized words of a particular speaker "i" according to equation (2) as follows:

$$W_i = \frac{1}{m} * \sum_{n=1}^{m} |Ln|, \quad (2)$$

wherein m is a number of misrecognized words.

7. The method of claim 6 wherein calculating the estimated weights further comprises:
running a force alignment program on the reference string to obtain statistics of references;
decoding the utterances to obtain statistics of 1-best hypothesis; and
aligning the 1-best hypothesis with the reference string to obtain the error words.

8. A method comprising:
(a) recognizing utterances of a speaker through converting the utterances into a recognized string, the utterances being received by a speaker input and converted to digital signals;
(b) comparing the recognized string with a reference string to determine errors;
(c) calculating estimated weights for sections of the utterances;
(d) marking the errors in the utterances and providing corresponding estimated weights to form adaptation enrollment data; and
(e) using the adaptation enrollment data to convert a speaker independent model to a speaker dependent model;
wherein calculating the estimated weights comprises computing an average likelihood difference per frame and then computing a weight value by averaging the average likelihood difference over all error words.

9. The method of claim 8, wherein the utterances are converted into the recognized string through applying the speaker independent model.

10. The method of claim 8, wherein parts (b)-(e) are repeated until differences between the reference and recognized strings are less than a threshold.

11. The method of claim 8, wherein the utterances are converted into a recognized string a first time through applying the speaker independent model and thereafter through applying the most recently obtained speaker dependent model.

12. The method of claim 8, wherein for a particular speaker, different misrecognized words have different weights.

13. The method of claim 8 wherein calculating the estimated weights further comprises:
running a force alignment program on the reference string to obtain statistics of references;
decoding the utterances to obtain statistics of 1-best hypothesis; and
aligning the 1-best hypothesis with the reference string to obtain the error words.

14. A method comprising:
(a) recognizing utterances of a speaker through converting the utterances into a recognized string, the utterances being received by a speaker input and converted to digital signals;
(b) comparing the recognized string with a reference string to determine errors;
(c) calculating estimated weights for sections of the utterances;
(d) marking the errors in the utterances and providing corresponding estimated weights to form adaptation enrollment data; and
(e) using the adaptation enrollment data to convert a speaker independent model to a speaker dependent model;
wherein calculating the estimated weights comprises calculating an average likelihood difference per frame according to equation (1) as follows:

$$Ln = \frac{H_L^n}{H_e^n - H_b^n} - \frac{R_L^n}{R_e^n - R_b^n}, \quad (1)$$

where $H_L^n$ is a log likelihood of hypothesis word n, $H_b^n$ is a beginning frame index (in time), and $H_e^n$ is an end frame index, and $R_L^n$, $R_b^n$ and $R_e^n$ are counter parts for the reference string, and calculating a weight for misrecognized words of a particular speaker "i" is calculated according to equation (2) as follows:

$$W_i = \frac{1}{m} * \sum_{n=1}^{m} |Ln|, \quad (2)$$

wherein m is a number of misrecognized words.

15. The method of claim 14 wherein calculating the estimated weights further comprises:
running a force alignment program on the reference string to obtain statistics of references;
decoding the utterances to obtain statistics of 1-best hypothesis; and
aligning the 1-best hypothesis with the reference string to obtain the error words.

16. An article of manufacture comprising:
a computer-readable storage medium having executable instructions thereon which when executed cause a processor to perform operations comprising:
(a) calculating estimated weights for identified errors in recognition of utterances based on a reference string;
(b) marking sections of the utterances as being misrecognized and associating the estimated weights with the sections of the utterances; and
(c) using the weighted sections of the utterances to convert a speaker independent model to a speaker dependent model;
wherein the estimated weights are computed through computing an average likelihood difference per frame and then computing a weight value by averaging the average likelihood difference over error words.

17. The article of manufacture of claim 16, wherein parts (a)-(c) are repeated at least once.

18. The article of manufacture of claim 16, wherein the utterances are converted into a recognized phone string a first time through applying the speaker independent model and thereafter through applying the most recently obtained speaker dependent model.

19. The article of manufacture of claim 16, wherein for a particular speaker, different misrecognized words have different weights.

20. The article of manufacture of claim 16 wherein the executable instructions causing the processor to perform calculating estimated weights comprises executable instructions thereon which when executed cause the processor to perform operations comprising:
running a force alignment program on the reference string to obtain statistics of references;
decoding the utterances to obtain statistics of 1-best hypothesis; and
aligning the 1-best hypothesis with the reference string to obtain the error words.

21. An article of manufacture comprising:
a computer-readable storage medium having executable instructions thereon which when executed cause a processor to perform operations comprising:
(a) calculating estimated weights for identified errors in recognition of utterances based on a reference string;
(b) marking sections of the utterances as being misrecognized and associating the estimated weights with the sections of the utterances; and
(c) using the weighted sections of the utterances to convert a speaker independent model to a speaker dependent model;
wherein an average likelihood difference per frame is used to calculate the estimated weights and is computed according to equation (1) as follows:

$$Ln = \frac{H_L^n}{H_e^n - H_b^n} - \frac{R_L^n}{R_e^n - R_b^n}, \qquad (1)$$

where $H_L^n$ is a log likelihood of hypothesis word n, $H_b^n$ is a beginning frame index (in time), and $H_e^n$ is an end frame index, and $R_L^n$, $R_b^n$ and $R_e^n$ are counter parts for the reference string, and
a weight for misrecognized words of a particular speaker "i" is calculated according to equation (2) as follows:

$$W_i = \frac{1}{m} * \sum_{n=1}^{m} |Ln|, \qquad (2)$$

wherein m a number of misrecognized words.

22. The article of manufacture of claim 21 wherein the executable instructions causing the processor to perform calculating estimated weights comprises executable instructions thereon which when executed cause the processor to perform operations comprising:
running a force alignment program on the reference string to obtain statistics of references;
decoding the utterances to obtain statistics of 1-best hypothesis; and
aligning the 1-best hypothesis with the reference string to obtain the error words.

23. An article of manufacture comprising:
a computer-readable storage medium having executable instructions thereon which when executed cause a processor to perform operations comprising:
(a) recognizing utterances through converting the utterances into a recognized phone string;
(b) comparing the recognized string with a reference string to determine errors;
(c) calculating estimated weights for sections of the utterances;
(d) marking the errors in the utterances and providing corresponding estimated weights to form adaptation enrollment data; and
(e) using the adaptation enrollment data to convert a speaker independent model to a speaker dependent model;
wherein the estimated weights are computed through computing an average likelihood difference per frame and then computing a weight value by averaging the average likelihood difference over error words.

24. The article of manufacture of claim 23, wherein the utterances are converted into the recognized string through applying the speaker independent model.

25. The article of manufacture of claim 23, wherein parts (b)-(e) are repeated until differences between the reference and recognized strings are less than a threshold.

26. The article of manufacture of claim 23, wherein the utterances are converted into a recognized string a first time through applying the speaker independent model and thereafter through applying the most recently obtained speaker dependent model.

27. The article of manufacture of claim 23, wherein for a particular speaker, different misrecognized words have different weights.

28. The article of manufacture of claim 23 wherein the executable instructions causing the processor to perform calculating estimated weights comprises executable instructions thereon which when executed cause the processor to perform operations comprising:
running a force alignment program on the reference string to obtain statistics of references;
decoding the utterances to obtain statistics of 1-best hypothesis; and
aligning the 1-best hypothesis with the reference string to obtain the error words.

29. An article of manufacture comprising:
a computer-readable storage medium having executable instructions thereon which when executed cause a processor to perform operations comprising:
(a) recognizing utterances through converting the utterances into a recognized phone string;
(b) comparing the recognized string with a reference string to determine errors;
(c) calculating estimated weights for sections of the utterances;
(d) marking the errors in the utterances and providing corresponding estimated weights to form adaptation enrollment data; and
(e) using the adaptation enrollment data to convert a speaker independent model to a speaker dependent model;
wherein an average likelihood difference per frame is used to calculate the estimated weights and is calculated according to the equation (1) as follows:

$$Ln = \frac{H_L^n}{H_e^n - H_b^n} - \frac{R_L^n}{R_e^n - R_b^n}, \quad (1)$$

where $H_L^n$ is a log likelihood of hypothesis word n, $H_b^n$ is a beginning frame index (in time), and $H_e^n$ is an end frame index, and $R_L^n$, $R_b^n$ and $R_e^n$ are counter parts for the reference string, and a weight for misrecognized words of a particular speaker "i" is calculated according to equation (2) as follows:

$$W_i = \frac{1}{m} * \sum_{n=1}^{m} |Ln|, \quad (2)$$

wherein m is a number of misrecognized words.

30. The article of manufacture of claim 29 wherein the executable instructions causing the processor to perform calculating estimated weights comprises executable instructions thereon which when executed cause the processor to perform operations comprising:

running a force alignment program on the reference string to obtain statistics of references;

decoding the utterances to obtain statistics of 1-best hypothesis; and aligning the 1-best hypothesis with the reference string to obtain the error words.

* * * * *